Figure 18:
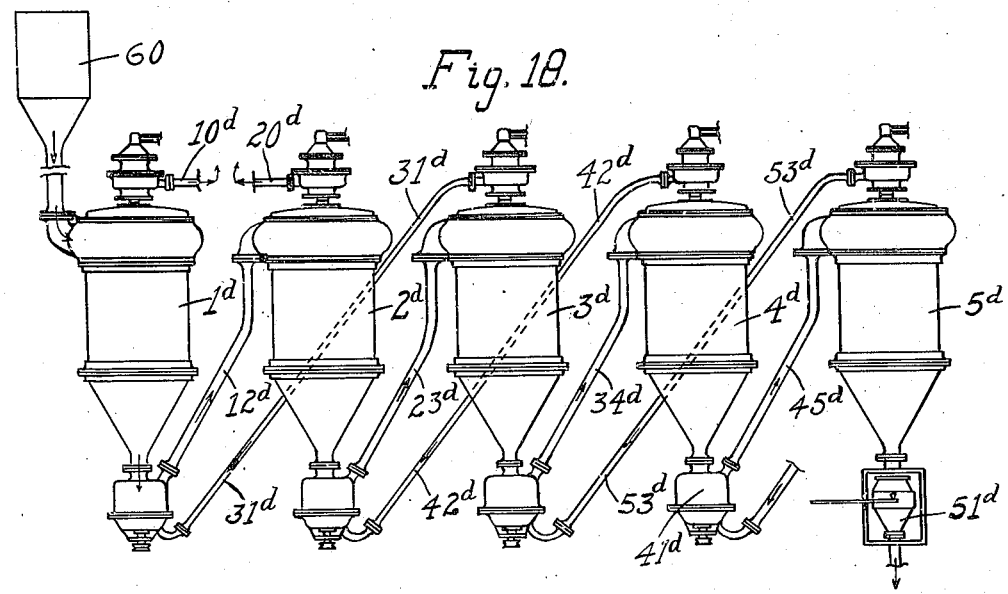

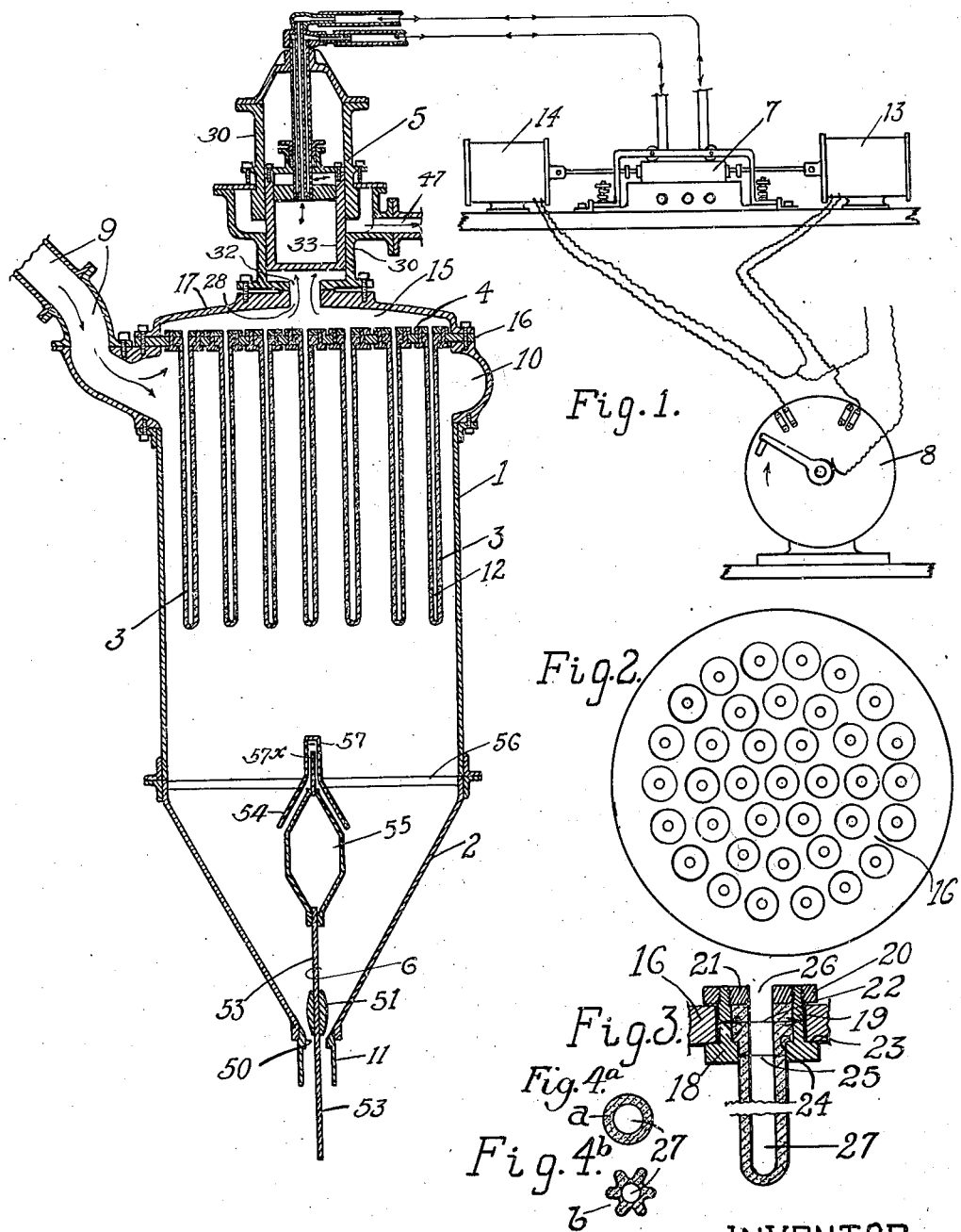

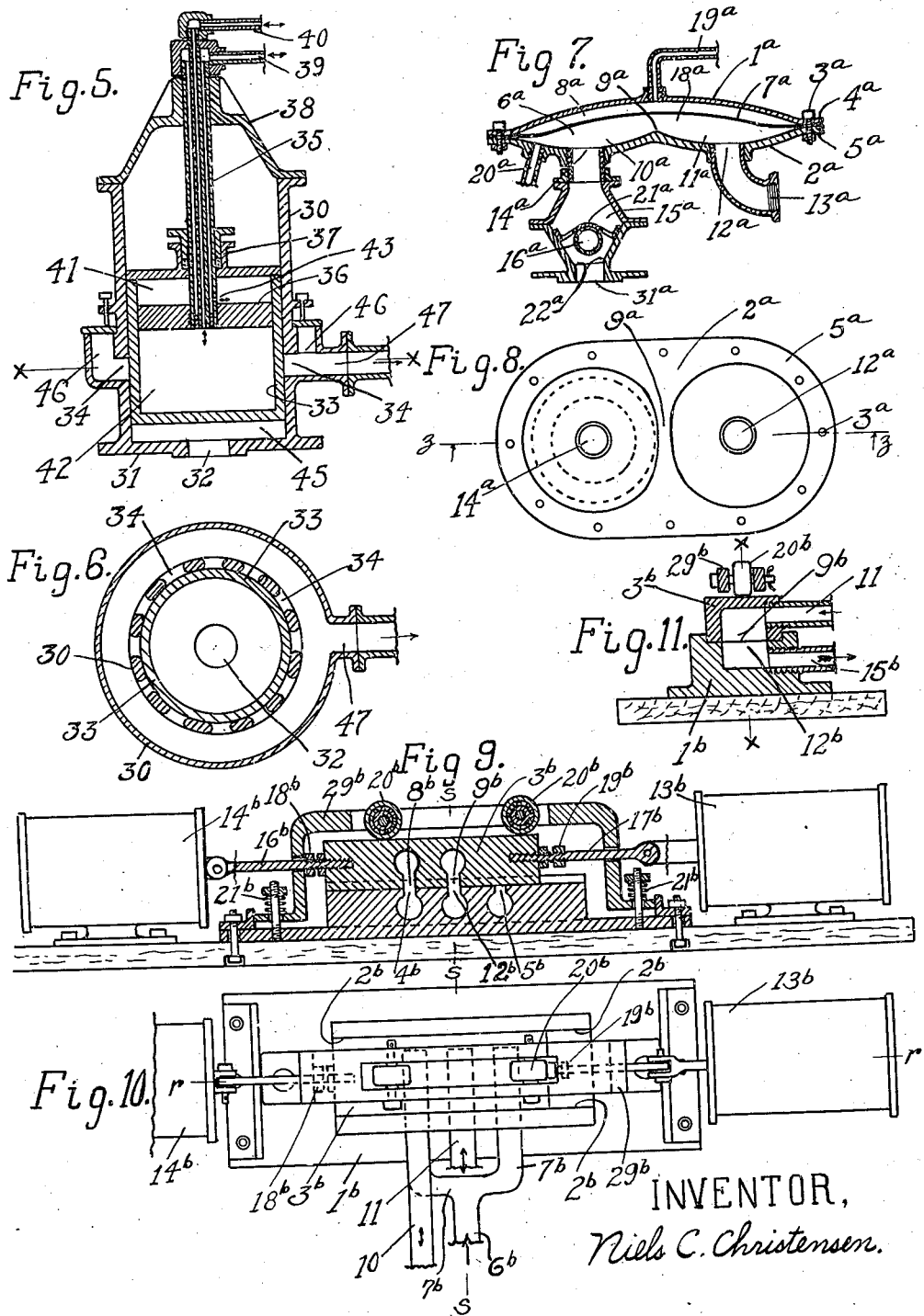

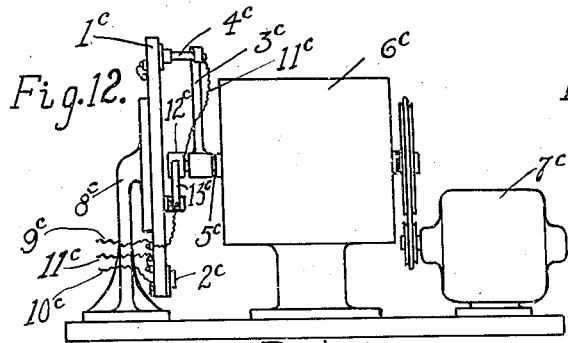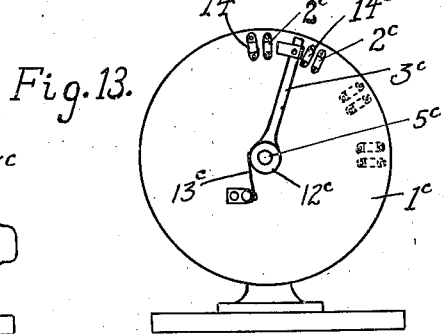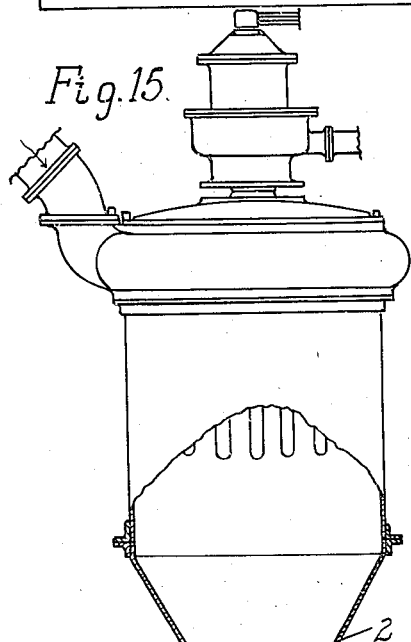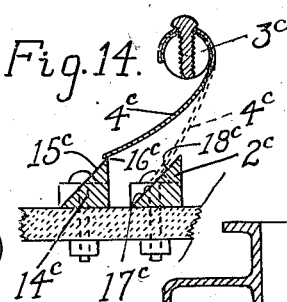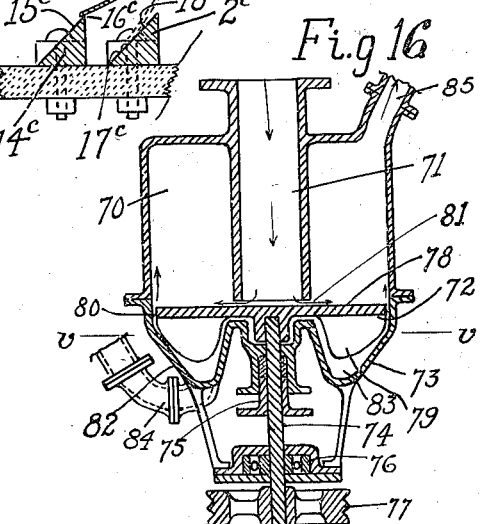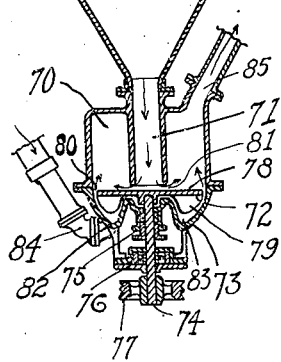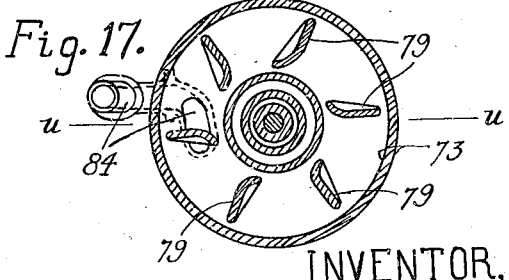

INVENTOR,
Niels C. Christensen.

Patented Mar. 31, 1936

2,035,592

UNITED STATES PATENT OFFICE 2,035,592

APPARATUS FOR TREATING MIXTURES OF FINELY DIVIDED SOLIDS AND LIQUIDS IN THICKENING AND COUNTERCURRENT WASHING OPERATIONS

Niels C. Christensen, Salt Lake City, Utah

Application March 2, 1933, Serial No. 659,425

4 Claims. (Cl. 210—182)

This invention relates to apparatus for the separation of liquids and finely divided solids from their mixtures, for use in such operations as the following: The clarifying of solutions; the thickening of dilute mixtures of liquids and finely divided solids preparatory to final filtration; the counter-current washing of finely divided solids with liquids to separate solutions or soluble materials therefrom; the counter-current treatment of finely divided solids with liquids; and other similar operations. It relates especially to methods and apparatus for such purposes in which the separation of liquids and solids is secured by filtration to remove liquids and settlement of the filtered residue to remove solids. It also relates especially to apparatus for such purposes in which said filtering operation and said counter-current washing operations may be carried out under pressure rather than under vacuum.

The older forms of apparatus used for thickening and counter-current washing, in which the separation of liquids and solids was secured by settling and decantation, require the use of excessively large tanks, and are limited as to the consistency of the thickened product and the clarity of the overflow. They are also entirely unsuited to operations requiring a limited time of treatement and to operations in which the solutions must be kept at temperatures much above atmospheric. Devices aimed to increase the capacity of such apparatus by filtering through a sand bed, the upper layer of which is continuously removed with the thickened product, have the added objection of contamination of the settled solids with the filter medium, which eliminates them from use in most chemical and metallurgical operations. The slightly increased capacity also does not compensate sufficiently for the increased complication of apparatus and operation, even in the cases where such apparatus is applicable. Other devices aimed to increase the capacity of such apparatus by the suspension of filter media in the settling tank and withdrawing solution through the filter leaves by means of a vacuum, and dropping the filter cake, for discharge through the bottom of the settling tank by the ordinary rakes or spiral mechanism, may secure a considerable reduction in the size of the settling tank, but the increase in capacity and diminution in size of the apparatus does not in most cases compensate for the increased cost and complication of the apparatus. The comparatively low difference in pressure secured by means of a vacuum and the difficulties inherent in dropping the cake and in maintaining the vacuum and at the same time securing a reasonably short cycle of operation, all militate against the successful use of this type of apparatus now in use. Even in those forms of this type in which the filtration is carried out under pressure, the full possibilities of this type of apparatus have not been realized or attained. For example, in those forms of this type of apparatus in which the buoyant effect of the mixture being filtered (or the weight of the filtrate being discharged) is utilized to actuate the valve mechanism controlling the operation and in which the pressure of the mixture upon the filter medium is periodically released by such means during the dropping of the filter cakes (or in those forms of this type of apparatus in which the filtration is carried out under vacuum and the filtration and discharge are controlled by reversals of a motor used to operate the vacuum pump) and in which no attempt is made to provide an accurate automatic control of the total time of the cycle and of the ratio of that portion of the total time of the cycle used in filtration or cake formation to that portion of the total time of the cycle used in dropping of the filter cake, the time lost in mere operation of the mechanism is so large a part of the cycle as to lose substantially all the advantages of high capacity which are possible with such apparatus, and the further loss in time due to failure to secure the optimum cycle for any mixture due to lack of very accurate control of the total time and of the ratio of the two portions of the time of each cycle, results in a loss of capacity which still further militates against the securing of the highest efficiency and capacity for this type of apparatus. Where the mixture is filtered under a vacuum this loss of time under the low presure difference available becomes so excessive as to destroy in large part all the advantages which may be obtained with this type of apparatus. This is particularly true when hot solutions are handled, in which case the vacuum is so low that the capacity of the apparatus is seriously reduced.

It is the object of this invention to overcome these defects inherent in apparatus now used for the purposes mentioned above; to reduce the size of apparatus required for a given capacity; to greatly reduce the lost time in each cycle of operation; to make it possible to vary the time cycle for materials of different characters so as to secure the maximum possible capacity for each material; to secure automatic control of the discharge of liquid and of thickened pulp; and especially to carry out the operation under pressure so as to make it possible to secure relatively very high capacities, and also to secure such capacities when handling hot solutions. It is also the object of the invention to make possible the counter-current washing or treatment operations mentioned above in a compact apparatus, of relatively very high capacity, automatically controlled, and especially to make it possible to carry out such operations under pressure, so as to secure the advantages of increased capacity and make possible the handling of hot solutions without the loss of capacity or other difficulties inherent in filtering hot solutions.

Figure 19:
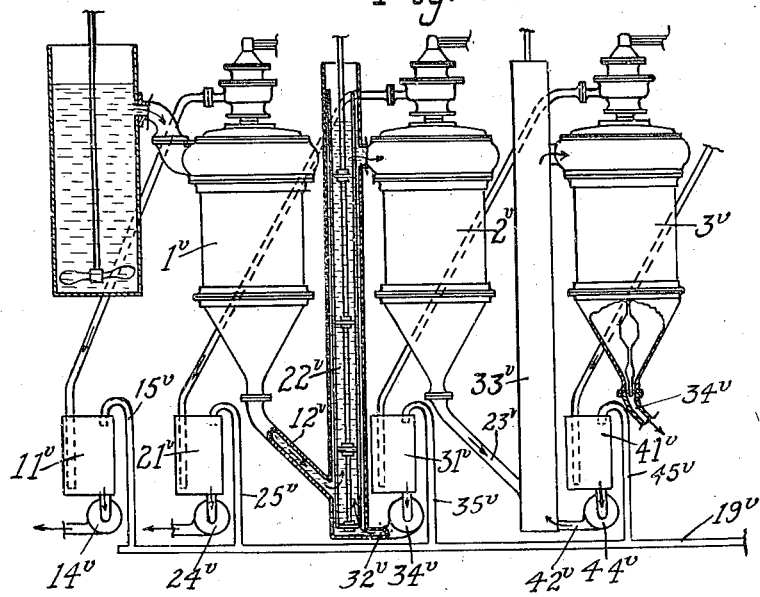

The apparatus of this invention and various combinations of the apparatus for different purposes and details of various parts of the apparatus are shown in the accompanying drawings. Figure 1 shows a vertical section and general arrangement of the device for such operations as thickening or dewatering under pressure. Figures 2, 3, 4a and 4b are larger scale drawings showing respectively a plan view of the header plate method of holding the tubes in place in the header plate, and cross-sections of the circular and fluted tubes. Figures 5 and 6 show the kickoff valve; Figure 5 being a vertical sectional view thereof and Figure 6 a horizontal sectional view. Figures 7 and 8 show a diaphragm type of kickoff valve, Figure 7 being a vertical section on the line z—z of Figure 8, and Figure 8 being a plan view of the valve with cover removed. The general arrangement of the air control valve is shown in Figures 9, 10, and 11. Figure 9 is a vertical longitudinal section on line r—r of Figures 10 and 11. Figure 10 is a plan view and Figure 11 a vertical cross-section on line s—s of Figures 9 and 10. The general arrangement of the timing device is shown in Figures 12 and 13, which are elevations of the device; Figure 12 a side elevation and Figure 13 a front elevation of the timing device. Figure 14 is a section through the contacts of the timing device. Figure 15 shows a vertical section of the device as preferably constructed for use in counter-current washing under pressure. Figures 16 and 17 are larger scale drawings illustrating the construction of the mixing and pumping device of Figure 15. Figure 16 shows a vertical section on the line u—u of Figure 17, and Figure 17 a horizontal section on line v—v of Figure 16. Figure 18 shows an arrangement of the invention for counter-current washing in which the form of device shown in Figure 15 is used. In Figure 19 an arrangement is shown for using the apparatus for counter-current washing in which vacuum is used in the filtering operation.

As noted in the foregoing, this invention may be used for a single simple operation of thickening or dewatering, and also for a series of such operations for separating solutions or soluble material from finely divided solids by counter-current washing. A form of the invention for the single thickening or dewatering operation is shown in Figure 1, which is a vertical section of the apparatus. The device consists of the following main parts: A vertical tank or container 1 (preferably of circular horizontal cross-section, though a square container or tank of any other suitable shape may be used) with a conical (or hoppered) bottom 2; a nest of vertical filter tubes (or plates or leaves) 3 suspended at their upper ends from a suitable header 4 which, preferably, closes the upper end of the tank 1; a combined solution outlet and cake kickoff valve 5 attached to said header 4; a thickened pulp discharge control device 6 at the apex of the conical (or hoppered) bottom 2 of the tank 1; a solenoid operated air valve 7 connected with the solution outlet and kickoff valve 5; an electrical timing device 8 connecting with the solenoids of the air valve 7. The functions of these various parts and their method of connection are briefly as follows: The container 1 receives the fluid pulp, i. e., mixture of liquid and finely divided solids, to be separated, and holds it in contact with the filter medium 3 suspended therein, and also holds the settled filter cake or thickened pulp in the conical bottom 2 and lower part of the tank for regulated discharge therefrom by means of the valve 6; the relatively dilute, or thin, pulp to be separated enters the tank, preferably near its upper end, through the inlet pipe 9 and is, preferably, distributed around the upper part of the container through annular channel 10 formed by the enlargement of the tank 1 below the header 4; the thickened pulp is discharged at the apex of the conical (or hoppered) bottom 2 through the pipe 11; the filter tubes 3 allow the liquid in the mixture being separated to flow through them into their enclosed solution passageways 12 and up through the header 4 into the clear solution space 15, thus forming a thickened pulp or cake on the outside of the tube (or plate) 3. The filter tubes 3 also allow a backward flow of a portion of said separated solution through said tubes to dislodge said thickened sludge or filter cake; the thickened discharge control device 6 regulates the discharge of the settled thickened pulp which accumulates in the bottom 2 of the container 1; the solution discharge and cake kickoff valve 5 allows the outflow of clear solution from the solution space 15, and at regulated intervals shuts off such flow and forces sufficient solution back through the filter medium 3 to drop the cakes therefrom; the air valve 7 regulates the supply of compressed air to and release of compressed air from the kickoff valve, said air valve being operated by the solenoids 13 and 14; the timing device 8 regulates the flow of electric current to the solenoids 13 and 14 so that the air valve 7 supplies compressed air and releases the air from the kick off valve 5 at the desired intervals. These various parts of the apparatus are connected as shown in Figure 1.

As previously noted, the tank or container 1 is preferably circular in cross-section. For use with non-corrosive solutions, it may be made of wood or iron; for use with corrosive solutions, it may be lined with rubber or acid-proof brick or tile; and for use with hot solutions, it may be covered externally with heat insulating material. The filter media 3 may consist of socks or leaves of canvas over a suitable rod or frame, but for ease of discharge and especially with corrosive solutions a hollow cylindrical or fluted tube of alundum (fused aluminum oxide) or other suitable material is preferred. The filter tubes 3 are suspended from the solution header 4, which consists preferably of a perforated header plate 16, and a cover 17 enclosing the solution space 15. This header 4 closes the upper end of the tank 1 and the filter tubes 3, which are suspended at their upper ends from the header 4, project down into the tank 1. The preferred method of attaching the tubes to the header 4 and the preferred type of filter tube are illustrated in Figures 2, 3, 4a and 4b as well as in Figure 1. The filter media 3 consist preferably, as shown in Figs. 3, 4a and 4b, of hollow porous alundum tubes 3 closed at the lower end and open at the upper end with a shoulder 18 at the upper end. The tubes 3 are suspended from the special connections 19, 20, and 21, which are attached to the header plate 16. The sleeves 19 are inserted upward into the hole 22 of the header plate 16 and locked into place upon the plate between the outer shoulders 23 and the lock-nuts 20. The filter tubes 3 are dropped through the hole 25 in the sleeve 19 and hung by the shoulders 18, which rest upon the inner shoulders 24 of the sleeve 19, and are locked firmly into place by means of the inside locking plugs or bushings 21. The plugs 21 are supplied with a central hole 26 through which the clear solution is discharged from the central channel 27 of the tubes 3 into the solution space 15 of the header 4. As previously noted, the central channel 27 of the filter tubes 3 is closed at the lower end but open at the upper end, as shown. The outer surface of the tubes may be either cylindrical or fluted, as shown in Figures 4a and 4b, which show a cross-section of both types of tubes; the former being the plane cylindrical type and the latter the fluted type. The fluting should, preferably, extend only up to the lower face of the sleeve 19.

The clear solution from the solution space 15 is discharged through the kickoff valve 5 and the filter cakes on the tubes 3 are dropped into the dilute pulp in the tank 1 by means of the kickoff valve 5, which is constructed and operated as described below: The form of kickoff valve shown in Figures 1, 5, and 6 consists of a stationary cylinder 30 closed at the lower end by the head or end plate 31 and attached to the cover 17 of the header 4 so that the outlet hole 28 in the cover corresponds with the inlet hole 32 in the end plate 31. The moving cylinder 33 is arranged to slide up and down in the stationary cylinder 30 so as to cover and uncover the outlet ports 34 in the wall of the cylinder 30. The moving cylinder 33 is closed at both ends except for the opening in the upper end through which the stationary hollow piston rod 35 passes. Attached to the inner end of the piston rod 35 is the stationary piston 36 inside the cylinder 33. The hollow piston rod 35 passes through the gland 37 in the upper end of the cylinder 33 and is held in position by the spider 38, which rests upon the upper end of the stationary cylinder 30. The air pipes 39 and 40 pass down inside the hollow piston 35, the former opening into the space 41 above the stationary piston 36 and the latter into the space 42 beneath the stationary piston 36 inside the cylinder 33 through the openings 43 and 44. The solution space 45 beneath the lower edge of the ports 34 is made sufficiently large to hold the amount of solution necessary to discharge the filter cakes upon the filter tubes 3 (of Fig. 1). The valve is operated by compressed air supplied from the air valve 7 (of Fig. 1) through the air pipes 39 and 40. When compressed air is admitted to the space 41 and released from the space 42, the piston 33 moves up so that the ports 34 are uncovered, allowing solution from the filter tubes 3 to fill the space 45 and flow out through the ports 34 into the closed discharge channel 46 to the discharge outlet 47. When compressed air is admitted to the space 42 and released from the space 41, the cylinder 33 moves down covering the ports 34 and forcing the solution in the space 45 out through the walls of the filter tubes 3, thereby loosening the cakes and allowing them to settle away from the tubes.

A diaphragm valve of the type shown in Figures 7 and 8 may be used as the kickoff valve if desired. This type of valve consists of two elliptical convex plates 1a and 2a held together by the bolts 3a through their flat rims 4a and 5a to enclose a chamber 6a between the plates. A flexible rubber diaphragm 7a of substantially the same area as the plates is clamped between the rims 4a and 5a of the plates, and divides the space 6a into two portions, the space 8a between the diaphragm and the upper plate 1a, and the space 18a between the diaphragm 7a and the lower plate 2a. A ridge 9a across the lower plate 2a forms the two concave depressions 10a and 11a. In the lower part of the depression 11a, an outlet opening 12a connects with the discharge pipe 13a. In the lower part of the depression 10a, the inlet opening 14a connects with the solution chamber 15a which is attached to the cover plate 17 (of Fig. 1) of the header 4 (of Fig. 1) of the main device, so that its inlet opening 14a corresponds with the outlet opening 28 (of Fig. 1) of the header 4. The air pipe 19a connects with the space 8a above the diaphragm and the air pipe 20a connects with the space 10a beneath the diaphragm. The solution chamber 15a is made of sufficient size to hold enough solution to discharge the cakes from the filter tubes, when this solution is forced back through the tubes. In the chamber 15a is the floating ball valve 16a, which floats in the solution into the guard 21a as the solution rises and sinks onto the seat 22a of the opening 31a as the solution falls, so as to prevent any flow of air through said opening into the header of the thickener. When air is exhausted through the pipes 19a and 20a, the solution flowing upward through the solution chamber 15a from the filter tubes of the thickener lifts the diaphragm 7a and flows out through the pipe 13a. When air under pressure is supplied through the pipes 19a and 20a, the diaphragm 7a is forced down upon the ridge 9a cutting off escape of liquid through the outlet pipe 13a, and the air supplied through the pipe 20a to the space 10a forces the solution in the chamber 15a back through the filter tubes (thus discharging the filter cake) until the ball 16a comes to rest upon its seat 22a.

The air valve, which regulates the supply and exhaust of compressed air to and from the kickoff valve, may be a slide valve of the type shown in Figures 9, 10 and 11. This valve consists of a stationary guide 1b with a groove 2b in its upper side in which the slide 3b moves back and forth. Both the guide 1b and the slide 3b are supplied with ports through which the air is passed to and from the kickoff valve. The ports 4b and 5b in the guide 1b connect with the compressed air supply pipe 6b through the pipes 7b. The ports 8b and 9b in the slide 3b connect with air lines 10 and 11, which are connected by means of flexible hose lines to the air chambers respectively above and below the stationary piston of the kickoff valve. The port 12b in the guide 1b connects with the exhaust line 15b. The valve is so designed that when the slide 3b is pulled into its extreme left hand position, as shown in Figures 9 and 10, the ports 4b and 8b meet, so that compressed air is supplied to the air chamber above the stationary piston in the kickoff valve through the air line 10, and the ports 9b and 12b meet so that the air is exhausted from the air chamber below the stationary piston in the kickoff valve through the pipe 11; and when the slide 3b is pulled into its extreme right position, the ports 5b and 9b and the ports 8b and 12b meet so that compressed air is supplied to the air chamber below the stationary piston in the kickoff valve and exhausted from the air chamber above the stationary piston in the kickoff valve. The slide 3b is pulled back and forth into these extreme positions by means of the solenoids 14b and 13b, which are attached to the slide by means of the rods 16b and 17b. The movement of the slide is limited by the stop nuts 18b and 19b on the rods 16b and 17b, which are stopped by end pieces of the stationary yoke 29. The lower surface of the slide 3b is held firmly in contact with the upper surface of the guide 1b by means of the rollers 20b carried by the yoke 29, which is pulled down by means of the springs 21b at the ends of the yoke as shown in Figures 9 and 10. If the diaphragm type of kickoff valve is used, the slide 3b will have only one port 8b and the guide 1b only one inlet port 4b and the exhaust port, as there is need in this case for using the air pressure only in the forcing back of the solution, as the solution lifts the diaphragm without any assistance when the air is exhausted from the space above the diaphragm.

The electric current, which actuates the solenoids of the slide valve, is supplied at the desired intervals through the timing device, which is shown in Figures 12, 13, and 14. The device consists of a circular disc 1c of an electric insulating material, upon one face of which are a series of contacts 2c arranged in a ring about the center of the disc as shown, and a moving arm 3c carrying a contact spring 4c through an annular path so that the spring 4c touches the contacts 2c as the arm carries the spring 4c around this path. The arm 3c is carried on a shaft 5c of a speed reducer 6c, the axis of the shaft being perpendicular to the disc 1c and passing through the center of the disc. The speed reducer 6c is preferably driven by the motor 7c by means of a V-belt and sheaves (which may be changed to alter the speed). The disc 1c is held in place by the support 8c. Alternate contacts 2c are connected with one wire 9c connecting with one of the solenoids, and the other half of the contacts 2c with the wire 10c connecting with one side of the electric circuit which operates the solenoids which control the air valve. The contact spring 4c is connected with the other side of the electric circuit, which controls the air valve through the wire 11 and slip ring 12c and brush 13c. Rapid make and break of contact between the spring 4c and the contacts 2c is secured by the means illustrated in Figure 14. Preceding each contact 2c in the path of the spring 4c is a wedge 14c attached to the disc 1c with its inclined face 15c sloping upward in the direction of the movement of the spring 4c, so arranged that the free end of the spring 4c rides up over the face 15c of the wedge, bringing the spring into tension so that when it is released at the apex 16c of the wedge, it springs into instantaneous contact with the sloping face 17c of the contact 2c. The contacts 2c are of wedge shape similar to the wedges 14c, so that the free end of the spring rides up over their sloping faces 18c bringing the spring into tension so that when the apex of the wedge is reached, the end springs rapidly away from the contact 2c. In this way a very rapid and clean closing and opening of the circuit is secured. As will be apparent from the foregoing, as the arm 3c carries the contact spring 4c around its path, current is furnished alternately to each of the solenoids which operate the air valve; and that by arranging the contacts 2c in pairs and properly spacing them, the ratio of the lengths of time during which current is supplied to each solenoid may be varied at will; and that the time of each such cycle may be varied by changing the motor speed or the ratio of the pulleys of the motor and speed changer.

By means of this timing device and the operating valves which it controls an accurate and entirely automatic control of the entire operating cycle may be secured, so that the total time of the cycle and the ratio of the time of filtration to the time consumed in discharge of the cake from the filter medium may both be adjusted to secure the optimum conditions for the thickening or filtration of any mixture. By means of this combination of electric timing device, solenoid operated air control valve and air operated kickoff valve and with continuous pressure of pulp upon the filter medium, a capacity and efficiency may be secured which is far in excess of the capacities and efficiencies secured by similar devices now in common use.

The thickened pulp made by settling of the filter cakes is discharged from the apex of the hopper bottom or cone 2 of the tank 1 (of Figure 1) by means of any suitable controlled density discharge valve, but preferably by means of the float valve arrangement shown in Figure 1. This valve consists of a valve seat 50 in the outlet pipe 11; a ball or plug 51 which closes the opening 52 in the seat 50 when it comes to rest on the seat; a rod 53 connecting the plug 51 and the float 55 and extending out through the opening 11; a shield 54 held in place by the braces or supports 56. The plug 51 is preferably tapered toward both ends, as shown, so as to allow an easy flow of pulp around it. The float and plug are held in position by the upwardly extending rod 57x which is guided in the member 57 in the apex of the shield and the downwardly extending of the rod 53 which extends through the outlet pipe 11. The weight and volume of the float 55 is made such that the float will sink in dilute pulp and will exert a strong upward force in pulp of the density it is desired to discharge.

The operation of the complete arrangement of the device, as illustrated in Figure 1, is as described below. The dilute pulp from a centrifugal pump or other suitable source flows into the dewaterer 1 through the inlet pipe 9. Under the head, the solution flows into the chamber 15 through the opening 32 and into the cylindrical member 30. The movable cylindrical-like member 33 of the kickoff valve is at that time in its elevated position and the solution passes out through solution outlet pipe 47, building filter cakes on the tubes 3. When the filter cakes have reached the desired thickness, the kickoff valve, operated under control of the timing device 8 and air valve 7, forces the solution in the chamber 42 of the kickoff valve back through the filter tubes 3 dropping the filter cakes, which settle into the hopper or cone 2. As the level of this thickened and settled pulp on the cone 2 rises, the upward pull of the float 55 on the plug 51 increases until the plug 51 is lifted from the seat 50 allowing the thickened pulp to discharge from the outlet pipe 11. As soon as the filter cakes drop away from the tubes 3, the timing device 8 operates the air valve 7 so that the moving cylinder 33 of the kickoff valve lifts above the ports 34, allowing the solution from the filter tubes 3 to discharge again through the outlet pipe 47 forming more cake, as described, and so on in continuous operation. The entire cycle is so arranged as to time of cake formation and discharge as to give the maximum capacity for the material being treated. The relatively very short time required to drop the filter cakes, makes it possible to operate with relatively thin filter cakes so that a very rapid rate of filtration is secured with only a small fraction of the total time of the cycle being lost in the dropping of the cake. The operation may be carried out under any desired pressure from a head tank or centrifugal pump. Both the pressure and the timing of the different parts of the cycle of operation may readily be adjusted to secure the highest efficiency and greatest possible capacity in the treatment of any mixture of finely divided solids and liquids. The simplicity of the design and operation of the device, the ease with which it may be adapted to different conditions, as to temperature and pressure and corrosion, will be apparent to metallurgists and engineers engaged in the hydrometallurgical operations.

The preferred form of device used in countercurrent washing differs slightly from that used in dewatering or thickening operations in that a device for mixing the thickened pulp and the filtered solutions between the separate dewaterers or thickneners of the series is required. The preferred type of mixer and pump is shown in Figures 15 to 18 inclusive. In this case, the thickened pulp discharge valve 6 of Figure 1 may be dispensed with, but otherwise the device is the same as that of Figure 1 with the addition of the mixing and pumping device. This device consists of a mixing chamber 70 into which the settled pulp from the cone 2 of the thickener flows through the inlet pipe 71 which extends down into the chamber 70. In the bottom of the chamber is a mixing and pumping runner 72 of which the bottom 73 forms the lower casing. The runner 72 is attached to the shaft 74 which passes through the gland 75 and outside bearing 76, and is driven by means of the pulley or sheave 77. The runner 72 consists of a flat circular plate 78 on the lower face of which are the pumping vanes 79. The plate 78 extends nearly to the walls of the chamber 70, leaving a narrow annular space 80 up through which solution may flow. The pulp inlet pipe 71 extends down almost to the plate 78, leaving the annular space 81 between its lower end and the plate 78 through which the thickened pulp enters the chamber 70. The pumping vanes 79 run in the annular depression 82 of the casing 73, which extends down below the level of the bottom of the runners, to form an annular channel for the entering solution. The clear solution, to be mixed with the thickened pulp, enters the casing 73 in its lower-most part through the solution inlet 84, and the mixed pulp leaves the chamber 70 through the pulp outlet pipe 85. The device operates as follows: The thickened pulp settles down through the inlet pipe 71 onto the middle of the rapidly revolving plate 78, which discharges this pulp at its outer rim as a thin sheet, where it mixes with the clear solution being pumped up through the annular opening 80 also in a relatively thin sheet. This mixed pulp circulates upward in the chamber 70 under the pressure from the pump vanes 79, and leaves the chamber through the outlet pipe 85. The vanes 79 and channel 83 being near the periphery of the plate 78, the solution entering the channel 83 is circulated so rapidly in this channel that there is no tendency for it to flow back through the gland 75.

The method of operating the dewaterers of the type shown in Figure 15 in series, in a counter-current washing or lixiviating operation under pressure, is shown in Figure 18. The dilute pulp from the storage tank 60 enters the first dewaterer 1d of the series, and is separated as described, the separated solution flowing out of the solution pipe 10d. The thickened pulp flows down into the mixing and pumping device, where it is mixed with the clear filtered solution from the third dewaterer 3d of the series, which enters the mixing device, as described, through the flow line 31d and the dilute mixture flows up through the pulp line 12d. The solids continue their flow through the series, being separated and mixed in each of the dewaterers 1d, 2d, 3d, and 4d passing from preceding dewaterers to succeeding ones through the pulp lines 12d, 23d, 34d, and 45d, and finally being separated and discharged from the controlled density discharge valve 51d of the final dewaterer 5d. The wash water (or solution) enters the mixer 41d of the dewaterer 4d (next to the last in the series) and passes into the dewaterer 5d in mixture with the solids, and is separated, as described, and passes forward through the successive dewaterers 4d, 3d, and 2d by way of the solution and pulp lines in the order 53d, 34d, 42d, 23d, 31d, 12d as shown, and is finally discharged as wash solution from the solution outlet 20d of the second dewaterer 2d of the series. If desired, the dewaterers of the series may not be directly connected by the pulp and solution pipes as shown, but the integral mixing devices described above may be eliminated and the thickened pulp and clear solution to be mixed may flow into an agitator beneath and between each pair of dewaterers, and be pumped by a separate pump to pressure tanks above and between each pair of dewaterers, from which the mixed dilute pulp would flow to the succeeding thickener of each pair. In this case, each dewaterer of the series would be supplied with a controlled density discharge valve, as described in connection with Figure 1.

The method of operating the dewaterers of the type shown in Figure 1 in a counter-current operation, using vacuum for filtration, is illustrated in Figure 19. In this case, each dewaterer is supplied with a vacuum tank 11v, 21v, 31v, etc., and between each pair of the series of dewaterers or thickeners is a mixer 22v, 33v into which the thickened pulp from the preceding dewaterer flows through the thickened pulp lines 12v, 23v, 34v, etc. and into which the solution from the second succeeding thickener of the series is pumped from the vacuum tank 21v, 31v, etc. attached to last said thickeners through the solution lines 32v, 42v, etc. by means of the pumps 34v, 44v, etc. The flow of solids and wash solution through the series counter-current is similar to that described in connection with Figure 18; the wash water entering the last mixer of the series, the final thickened pulp being discharged from the last dewaterer of the series, and the first solution and wash solution respectively from the first two thickeners 1v and 2v, being discharged from the vacuum tanks 11v and 21v by means of the pumps 14v and 24v as shown. Vacuum is applied through the vacuum line 19v and lines 15v, 25v, 35v, etc. as shown. The method of operating the devices in series, as illustrated in Figures 18 and 19, will be apparent to hydrometallurgists and engineers and needs no further detailed description.

In the operation of a series of thickeners for counter-current washing, as illustrated in Figures 18 and 19, the contacts and wiring on the disc of the timing device of Figures 12, 13, and 14 may be so arranged that the single timing device may so operate the air valves which control the operation of the kickoff valves on each dewaterer of the series, the operation of the series of air valves being so timed as to avoid simultaneous operation and thus avoid excessive peak loads on the air compression system.

For most purposes, the operation of the device under pressure, as shown in Figures 1, 15, and 18, will be preferred on account of the much greater capacity obtainable, and the greater ease of operation since all trouble from leaks is easily eliminated. For hot solutions, operation under pressure is the only feasible method in practically all cases due to the low vacuum obtainable with hot solutions. For rapid filtering material and cold solutions, operation with a vacuum, as illustrated in Figure 19 may be used, but this method will not give the ease of operation and very high capacity obtainable when the device is operated under pressure.

By operating the device under continuous constant pressure with accurate automatic control of the complete cycle of operation so that the time lost in mechanical operation of the control devices is reduced to a minimum and so that the time of filtration is the optimum for the mixture being treated and the time consumed in dropping the filter cakes is reduced to the minimum, as above described, a highly efficient capacity may be secured in relation to area of filter medium and size of apparatus required. When the device is used in series for counter-current washing or lixiviation as described, the invention makes it possible to carry out such operations under conditions of temperature and pressure which are not feasible in the devices now in common use.

Having described my invention, what I claim and desire to patent is:

1. As a separating unit in a series of apparatus for the recovery of soluble material from mixtures of finely divided solid particles and liquids by counter-current washing; the apparatus for treating said relatively dilute mixtures of solids and liquids to separate clear solution therefrom and to secure a more concentrated mixture of solid particles and liquid, which consists of a closed settling chamber with a hoppered bottom; in the upper part of said settling chamber a nest of filter tubes suspended in vertical position by their upper ends from a header at the upper end of said settling chamber with the lower ends of the solution channels of said filter tubes closed and the upper ends of said solution channels opening above said header; a compressed air actuated kickoff valve connected with said header and arranged to allow the outflow of solution from said header and to operate at intervals to stop said outflow of solution and to thereafter force solution within said valve back into said header and through said filter tubes, said valve including an air pressure actuated piston; and a discharge valve arranged to allow the outflow of a relatively concentrated mixture of solid particles and liquid of the desired density from the lower part of the hoppered bottom of said settling chamber.

2. The apparatus for the recovery of soluble material from mixtures of finely divided solid particles and solution by counter-current washing, which consists of a number of separating units, each of said units including a closed settling chamber having a hoppered bottom, a header in the upper end of said chamber, filter tubes supported to depend from said header, and valve means for reversing the flow of fluid into and out of said header, said units being arranged in a series with mixing chambers between successive separating units of the series and so arranged and connected that thickened mixture from each separating unit except the last of said series is discharged into the succeeding mixing chamber, and that clear solution from the kickoff valve of each separating unit except the first two is discharged into the second preceding mixing chamber, and so that the mixture from each mixing chamber is introduced into the thickening chamber of the succeeding separating unit under a higher pressure than that maintained in the header of said unit; together with means for supplying relatively dilute mixture of finely divided solids and solution to the thickening chamber of the first separating unit of said series; and means for supplying wash liquid to the last mixing chamber of said series; and means for withdrawing solution from the first two separating units of said series and means for discharging relatively concentrated mixture of solid particles and liquid from the mixing chamber of the last separating unit of said series.

3. Apparatus for the recovery of soluble material from mixtures of finely divided solid particles and liquid by counter-current washing, which consists of a number of connected separating units arranged in a series with mixing chambers between successive units of the series, so arranged that thickened mixture from each separating unit except the last of the series is discharged into the succeeding mixing chamber and clear liquid from each separating unit except the first two is discharged into the second preceding mixing chamber, together with means for introducing the dilute mixture under pressure from each of said mixing chambers into the settling chamber of the succeeding unit of said series; means for supplying mixture to be separated to the first unit in said series under pressure; means for supplying wash liquid to the last mixing chamber of said series; means for withdrawing clear liquid from the first two units of said series; and means for withdrawing relatively concentrated mixture from the settling chamber of the last unit of said series.

4. In an apparatus of the character described, the combination of a settling chamber; at least one filter tube, the open upper end whereof is in communication with a discharge opening extending from said chamber; a cylindrical member, the lower end whereof communicates with the discharge opening; a hollow piston-like element mounted for reciprocation within said cylinder and serving when moved to control the opening and closing of a discharge port for filtrate extending from the cylinder at a distance from its lower end, and likewise when it is moved in a downward direction after the discharge port is closed, to set up pressure within the filter tubes; a solid fixed piston-like element mounted within the hollow piston-like member and fixed against movement relative thereto; and means for admitting air under pressure to the hollow cylindrical member above and below the solid fixed piston, in alternation.

NIELS C. CHRISTENSEN.